(12) United States Patent
Liu et al.

(10) Patent No.: US 6,316,097 B1
(45) Date of Patent: Nov. 13, 2001

(54) ELECTROLESS PLATING PROCESS FOR ALTERNATIVE MEMORY DISK SUBSTRATES

(75) Inventors: Connie C. Liu, San Jose; Linda L. Zhong, Fremont; Jeff D. St. John, Los Gatos; Samuel D. Harkness, San Francisco; Qixu Chen, Milpitas, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/395,988

(22) Filed: Sep. 15, 1999

Related U.S. Application Data

(60) Provisional application No. 60/102,160, filed on Sep. 28, 1998.

(51) Int. Cl.$^7$ .................................................. G11B 5/66
(52) U.S. Cl. ......................... 428/332; 428/336; 428/65.6; 428/65.7; 428/694 TS; 428/694 ST; 428/694 SG; 428/900; 427/129; 427/131; 427/132; 204/192.2
(58) Field of Search ..................................... 427/129, 131, 427/132, 438; 204/192.2; 428/694 TS, 694 ST, 694 SG, 900, 332, 336, 65.6, 65.7

(56) References Cited

U.S. PATENT DOCUMENTS

| | | | |
|---|---|---|---|
| 3,904,792 | 9/1975 | Gulla et al. | 427/304 |
| 3,961,109 | 6/1976 | Kremer et al. | 427/304 |
| 4,604,299 | 8/1986 | De. Luca et al. | 427/98 |
| 4,659,605 | * 4/1987 | Malik | 427/129 |
| 4,929,499 | 5/1990 | Shadzi et al. | 428/336 |
| 4,933,010 | 6/1990 | Okabayashi | 106/1.11 |
| 5,153,044 | 10/1992 | Chen et al. | 428/65.5 |
| 5,273,834 | 12/1993 | Hoover et al. | 428/694 ST |
| 5,714,207 | 2/1998 | Kuo | 427/555 |
| 5,723,032 | 3/1998 | Yamaguchi et al. | 204/192.2 |
| 5,733,370 | 3/1998 | Chen et al. | 117/105 |
| 5,741,403 | 4/1998 | Tenhover et al. | 204/192.2 |
| 5,855,951 | * 1/1999 | Nelson | 427/129 |
| 5,858,566 | 1/1999 | Zhang | 428/694 TS |
| 5,861,196 | 1/1999 | Kuo et al. | 427/555 |
| 5,866,227 | 2/1999 | Chen et al. | 428/65.3 |
| 5,871,621 | 2/1999 | Ross | 204/192.2 |
| 5,876,848 | 2/1999 | Tan et al. | 428/336 |

* cited by examiner

Primary Examiner—Leszek Kiliman
(74) Attorney, Agent, or Firm—McDermott, Will & Emery

(57) ABSTRACT

Magnetic recording media including an alternative substrate material having a Young's Modulus greater than that of Al-based substrate materials and a preselected average surface roughness (Ra) are formed by depositing a continuous, adherent, non-magnetic, catalytically active layer on a surface of the substrate and electrolessly plating an amorphous seed layer on the catalytically active layer, the Ra of the resultant surface of the amorphous seed layer being reduced from that of the substrate, thereby providing a substantially defect-free surface for deposition thereon of magnetic recording media layers thereon. Embodiments include sputter depositing an catalytically active layer of Ni—Al or Ni—P and electrolessly plating an amorphous seed layer of Ni—P thereon.

19 Claims, 2 Drawing Sheets

ELECTROLESS PLATING PROCESS FOR ALTERNATIVE MEMORY DISK SUBSTRATES

CROSS-REFERENCE TO PROVISIONAL APPLICATION

This application claims priority from provisional patent application Ser. No. 60/102,160 filed Sep. 28, 1998, the entire disclosure of which is incorporated herein by reference.

FIELD OF THE INVENTION

The present invention relates to a method of manufacturing a magnetic recording medium, such as a thin film magnetic recording disk. The invention has particular applicability in manufacturing low noise, high areal recording density magnetic recording media utilizing alternative substrates having a greater Young's Modulus than conventional aluminum (Al)-based substrates.

BACKGROUND OF THE INVENTION

Magnetic media are widely used in various applications, particularly in the computer industry. A conventional longitudinal recording disk medium 1 used in computer-related applications is schematically depicted in FIG. 1 and comprises a non-magnetic metal substrate 10, typically of an aluminum (Al) alloy, such as an aluminum-magnesium (Al—Mg) alloy having sequentially deposited thereon a plating layer 11, such as of amorphous nickel-phosphorus (Ni—P), a polycrystalline underlayer 12, typically of chromium (Cr) or a Cr-based alloy, a magnetic layer 13, e.g., of a cobalt (Co)-based alloy, and a protective overcoat layer 14, typically containing carbon (C). The Co-based alloy magnetic layer 13 deposited by conventional techniques, e.g., sputtering, normally comprises polycrystallites epitaxially grown on the polycrystalline Cr or Cr-based alloy underlayer 12.

In operation of medium 1, the magnetic layer 13 can be locally magnetized by a write transducer, or write head, to record and store information. The write transducer creates a highly concentrated magnetic field which alternates direction based on the bits of information being stored. When the local magnetic field produced by the write transducer is greater than the coercivity of the recording medium layer 13, then the grains of the polycrystalline medium at that location are magnetized. The grains retain their magnetization after the magnetic field produced by the write transducer is removed. The direction of the magnetization matches the direction of the applied magnetic field. The magnetization of the recording medium can subsequently produce an electrical response in a read transducer, allowing the stored information to be read.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop (CSS) method commences when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the surface of the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in the air, sliding against the surface of the disk, and stopping.

It is considered desirable during reading and recording operations to maintain each transducer head as close to its associated recording surface as possible, i.e., to minimize the flying height of the head. Thus, a smooth recording surface is preferred, as well as a smooth opposing surface of the associated transducer head, thereby permitting the head and the disk to be positioned in close proximity, with an attendant increase in predictability and consistent behavior of the air bearing supporting the head during motion. However, if the head surface and the recording surface are too flat, the precision match of these surfaces gives rise to excessive stiction and friction during the start-up and stopping phases of the cyclic sequence, thereby causing wear to the head and recording surfaces, eventually leading to what is referred to as "head crash". Thus, there are competing goals of reducing head/disk friction and minimizing transducer flying height.

Conventional practices for addressing these apparent competing objectives involve providing a magnetic disk recording medium with a toughened recording surface to reduce head/disk friction by techniques generally known as "texturing". Conventional texturing techniques involve polishing the surface of a disk substrate to provide a texture thereon prior to subsequent deposition thereon of layers, such as an underlayer, a magnetic layer, a protective overcoat, and a lubricant topcoat, wherein the textured surface of the underlying substrate is intended to be substantially replicated in the subsequently deposited layers.

A variety of techniques, including laser-based techniques, have been developed for texturing metal-based magnetic recording medium substrates, e.g., the Ni—P plated Al-based substrates described supra. Such substrates, however, exhibit low head impact resistance due to the low mechanical yield strength (e.g., as reflected by Young's Modulus values less than about 72 Gpa), thereby limiting their utility such that they are not particularly desirable for use in mobile computer data storage applications, such as lap-top computers. As compared to conventional, Ni—P plated, Al-based substrates, glass, glass-ceramic, ceramic, and metal-ceramic substrates having greater values of Young's modulus exhibit superior shock resistance. Accordingly, such "alternative" substrates are desirable candidates for use in data storage applications, particularly mobile computer applications. In addition to the requirement for good shock resistance, the "alternatives" type substrates are required to provide good vibration performance, especially when utilized in high rpm disk drives.

A number of advanced, high track per inch (TPI), low track misregistration (TMR), and non-repeatable run-out (NRRO) alternative substrates have been proposed for use in hard disk drive applications. However, none of the proposed alternative substrates has been utilized for the manufacture of practical disk drives, for the following reasons:

1. Poor lapability/grindability: in general, the glass, ceramic, and glass-ceramic and metal-ceramic composite materials contemplated for use as hard disk substrates are extremely difficult to lap or grind according to conventional techniques. More specifically, pure ceramic materials such as alumina ($Al_2O_3$) are too hard to grind, and metal-ceramic composites (e.g., ceramic within a metal matrix) contain at least two non-uniform phases, i.e., a soft phase and a hard phase, which make the grinding process even more difficult. Moreover, the ultimate cost for grinding such substrates is significantly higher than that for conventional Ni—P plated, Al-based substrates.

2. Poor platability: due to the multi-phase nature and multi-crystal features of such alternative substrates, plating of a Ni—P seed layer for ensuring proper polycrystallinity of a Cr-based underlayer is necessary, as in the case of conventional Al-based substrates. However, the requirements for low TMR and high TPI require formation of Ni—P seed layers with defect-free surfaces after plating and/or polishing, with an attendant requirement for planarity which is higher than that required for conventional Al-based substrates. To date, none of the tested alternative substrates has evinced an ability to achieve a surface finish even approaching that of the conventional Ni—P plated, Al alloy substrates.

3. Plating of non-conductive disks: currently available non-conductive substrate candidates for use as disk-type magnetic recording media include glass, glass-ceramics, and ceramics, none of which provide the catalytically active surface which is requisite for electroless plating of the amorphous seed layer (typically of Ni—P) thereon prior to deposition of the polycrystalline underlayer (typically of Cr or a Cr-based alloy). As a consequence, conventional processing for electroless Ni—P deposition on such non-conductive substrates involves a sensitization pre-treatment with colloidal palladium (Pd) prior to immersion in the electroless Ni—P plating bath, e.g., as disclosed in U.S. Pat. Nos. 3,904,792; 3,961,109; 4,604,299; and 4,933,010, the entire disclosures of which are incorporated herein by reference. However, these sensitization pre-treatment procedures were developed mainly in the context of printed circuit board (PCB) manufacturing where microscopic (e.g., nanometer-dimensioned) defects in the produced Ni—P plating layers were not critical. Since the sensitizer, or activator, layer formed by such processing methodology consists essentially of discontinuous Pd, e.g., discrete Pd islands formed at spaced-apart locations on the substrate surface, it is therefore very difficult to obtain a fully sensitized surface (i.e., fully Pd-covered) required for obtaining nano-defect free Ni—P electrolessly plated layers thereon such as a required in the manufacture of high-density magnetic storage media. Additionally, the adhesion of Pd-activated electrolessly plated Ni—P coatings on such non-conductive substrate surfaces is obtained by acid etching and roughening to provide anchoring of the coating layer.

Disadvantageously, however, the chemical etching process frequently results in the formation of surface defects, e.g., cavities and pits.

4. Plating of metal-ceramics substrates: currently available metal-ceramics composites which are candidates for use as substrates in magnetic recording media comprise an Al or Al-alloy matrix and ceramic particles held within the matrix. Such metal-ceramics composites, e.g., Al-ceramics composites, are typically activated for Ni—P plating thereon by means of a zincating process. However, the inability to plate on the non-conductive ceramic particles within the conductive metal matrix results in the formation of discontinuous Zn films, i.e., spaced-apart islands, as with the wholly non-conductive glass, ceramic, and glass-ceramics substrates described above. Such discontinuous Zn film formation typically results in the formation of plating defects in the form of pits. As a consequence, the defect level of the plating layer(s) is essentially determined by the size and distribution of the ceramic particles within the metal matrix, and it is very difficult to achieve defect-free Ni—P seed layers for use in memory disks by the use of existing electroless process methodology.

Accordingly, there exists a need for an improved electroless plating process suitable for forming defect-free plating or seed layers required in the manufacture of high-density magnetic recording media utilizing alternative substrate materials, which process provides coatings which are adherent to the substrate as well as to layers formed thereon. In addition, there exists a need for an improved electroless processing methodology for manufacturing alternative substrate-based high-density magnetic recording media which is simple, costeffective, and fully compatible with the productivity and throughput requirements of automated manufacturing technology.

The present invention fully addresses and solves the above-described problems attendant upon the manufacture of high-density magnetic recording media and hard drives utilizing alternative-type substrates, while maintaining full compatibility with all mechanical aspects of conventional disk drive technology.

DISCLOSURE OF THE INVENTION

An advantage of the present invention is an improved method of electrolessly plating alternative-type substrates for use in high-density magnetic recording media.

Another advantage of the present invention is an improved method of electrolessly plating a substantially defect-free amorphous seed layer on an alternative-type magnetic recording media substrate having a Young's Modulus greater than that of aluminum and its alloys.

Yet another advantage of the present invention is an improved magnetic recording medium comprising an alternative-type substrate and including an electrolessly-plated seed layer formed according to the inventive methodology.

A still another advantage of the present invention is an improved magnetic recording medium comprising a non-magnetic substrate and means on the substrate for providing a substantially defect-free surface for formation of a magnetic recording layer thereon.

Additional advantages and other features of the present invention will be set forth in the description which follows and in part will become apparent to those having ordinary skill in the art upon examination of the following or may be learned from practice of the present invention. The advantages of the present invention may be realized and obtained as particularly pointed out in the appended claims.

According to one aspect of the present invention, the foregoing and other advantages are obtained in part by a method of fabricating a magnetic medium including a substrate having a Young's Modulus greater than that of aluminum (Al) and its alloys and a surface with a preselected average roughness (Ra), which method comprises the sequential steps of:

(a) depositing a continuous, adherent, non-magnetic, catalytically active layer on the substrate surface; and (b) electrolessly plating an amorphous seed layer comprising a metal, metal alloy, or metal compound on the catalytically active layer, the Ra of the resultant surface of the amorphous seed layer being reduced from the preselected Ra of the substrate surface, thereby providing a substantially defect-free surface for deposition thereon of (a) layer(s) comprising the magnetic recording medium.

According to embodiments of the present invention, the substrate comprises a material selected from glass, glass-ceramics, ceramics, and metal ceramic composites; step (a) comprises depositing, by a physical vapor deposition (PVD), chemical vapor deposition (CVD), or a plasma-enhanced chemical vapor deposition (PECVD) process, a continuous, catalytically active layer comprising a metal selected from the group consisting of nickel (Ni), palladium (Pd), titanium (Ti), aluminum (Al), zinc (Zn), copper (Cu), and alloys and compounds thereof with non-metals; and step (b) comprises electrolessly plating an amorphous seed layer comprising a material selected from Ni—P alloys with phosphorus (P) content in the range of from about 10 to about 13.5 wt. %, optionally followed by polishing of the Ni—P amorphous seed layer.

According to further embodiments of the present invention, step (a) comprises sputter depositing a catalytically active layer of Ni-Al or Ni—P about 50 to about 5,000 Å thick and further includes first depositing an adhesion layer comprising a metal, metal alloy, or ceramic layer on the substrate surface prior to depositing the catalytically active layer.

According to a still further embodiment of the present invention, the method comprises the further steps of:

(c) depositing a magnetic recording layer over the amorphous seed layer; and (d) forming a protective overcoat layer over the magnetic recording layer.

According to another aspect of the present invention, a method of manufacturing a magnetic recording media comprises the sequential steps of:

(a) providing a disk-shaped substrate comprising a material having a Young's modulus greater than that of Al and its alloys and a surface with a preselected Ra;

(b) depositing a continuous, adherent, non-magnetic, catalytically active layer on the substrate surface by a PVD process, the catalytically active layer comprising a metal selected from Ni, Pd, Ti, Al, Zn, Cu, and alloys and compounds thereof with non-metals; and (c) electrolessly plating a seed layer of amorphous Ni—P on the catalytically active layer, the Ra of the resultant surface of the amorphous Ni—P seed layer being reduced from the preselected Ra of the substrate surface, and providing a substantially defect-free surface for deposition thereon of layers comprising the magnetic medium layer(s).

According to embodiments of the present invention, step (a) comprises providing a substrate comprising a material selected from glass, glass-ceramics, ceramics, and metal-ceramics; and the method comprises the further steps of:

(d) depositing a magnetic recording layer over the amorphous Ni—P seed layer; and (f) forming a protective overcoat layer over the magnetic recording layer.

In further embodiments according to the present invention, step (a) comprises providing a glass-ceramic substrate having a surface Ra of about 800 Å; step (b) comprises sputter depositing a continuous, catalytically active layer comprising Ni—Al or Ni—P from about 50 to about 5,000 Å thick; and step (c) comprises electrolessly plating a seed layer of amorphous Ni—P about 1 to about 20 µm thick and having a resultant surface Ra of less than about 550 Å.

In still further embodiments according to the present invention, step (b) further comprises depositing a layer of an adhesion promoting material selected from Cr, Ti, Cr—Ti alloys, alumina ($Al_2O_3$), and other ceramics, from about 10 to about 100 Å thick, on the substrate surface prior to depositing the catalytically active layer thereon.

According to still another aspect of the present invention, a magnetic recording media comprising an alternative-type substrate and including an electrolessly plated seed layer formed according to the inventive methodology, is provided, comprising:

a non-magnetic substrate having a Young's Modulus greater than that of Al and its alloys and a surface with a preselected surface roughness (Ra);

a continuous, adherent, non-magnetic, catalytically active layer on the substrate surface; and an electrolessly plated, amorphous seed layer comprising a metal, metal alloy, or metal compound on the catalytically active layer, the surface of the amorphous seed layer being substantially defect-free and having an Ra less than that of the substrate surface.

According to still another aspect of the present invention, a magnetic recording medium is provided, comprising:

a non-magnetic substrate having a Young's Modulus greater than that of Al and a surface having a preselected average surface roughness Ra; and means for providing a substantially defect-free surface for formation of a magnetic recording layer thereover and having an Ra less than the preselected Ra.

Additional advantages of the present invention will become readily apparent to those skilled in the art from the following detailed description, wherein embodiments of the invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawing and description are to be regarded as illustrative in nature, and not as limitative.

BRIEF DESCRIPTION OF THE DRAWINGS

The following detailed description of the embodiment of the present invention can best be understood when read in conjunction with the following drawings, in which like reference numerals are employed throughout to designate similar features, wherein.

DESCRIPTION OF THE INVENTION

The present invention addresses and solves problems arising from the inability to provide alternative-type substrates for use in magnetic recording media, such as hard disks, with suitable defect-free surfaces required for deposition of magnetic recording medium layers thereon. More specifically, the inventive methodology avoids the problems of poor lapability/grindability of glass, glass-ceramics, ceramics, and metal-ceramic composite alternative substrates and formation of poorly adherent, defect-containing amorphous seed layers thereon by conventional electroless plating techniques.

According to the present invention, the above-enumerated problems and difficulties attendant upon the use of alternative-type substrates for the manufacture of magnetic recording media, such as hard disks, are eliminated, or at least minimized, by the inventive methodology wherein the conventional chemical sensitization step performed preliminary to electroless plating of the amorphous seed layer, which process typically results in formation of discontinuous catalytic metal deposits (i.e., "islands") which in turn result in defects in the seed layer formed thereon, is replaced by a step of depositing a continuous, adherent, non-magnetic, catalytically active layer on the substrate surface. Subsequent electroless deposition of the amorphous seed layer on the continuous, catalytically active layer results in a smoothening effect, wherein the average surface roughness (Ra) of the resultant surface of the seed layer is lower than that of the underlying alternative-type substrate. The resultant surface of the seed layer, after polishing, is substantially defect-free with respect to the formation of the layers comprising the magnetic recording medium thereon. Alternatively, the resultant surface of the amorphous seed layer can receive a texturizing treatment, if desired.

Figure 1:
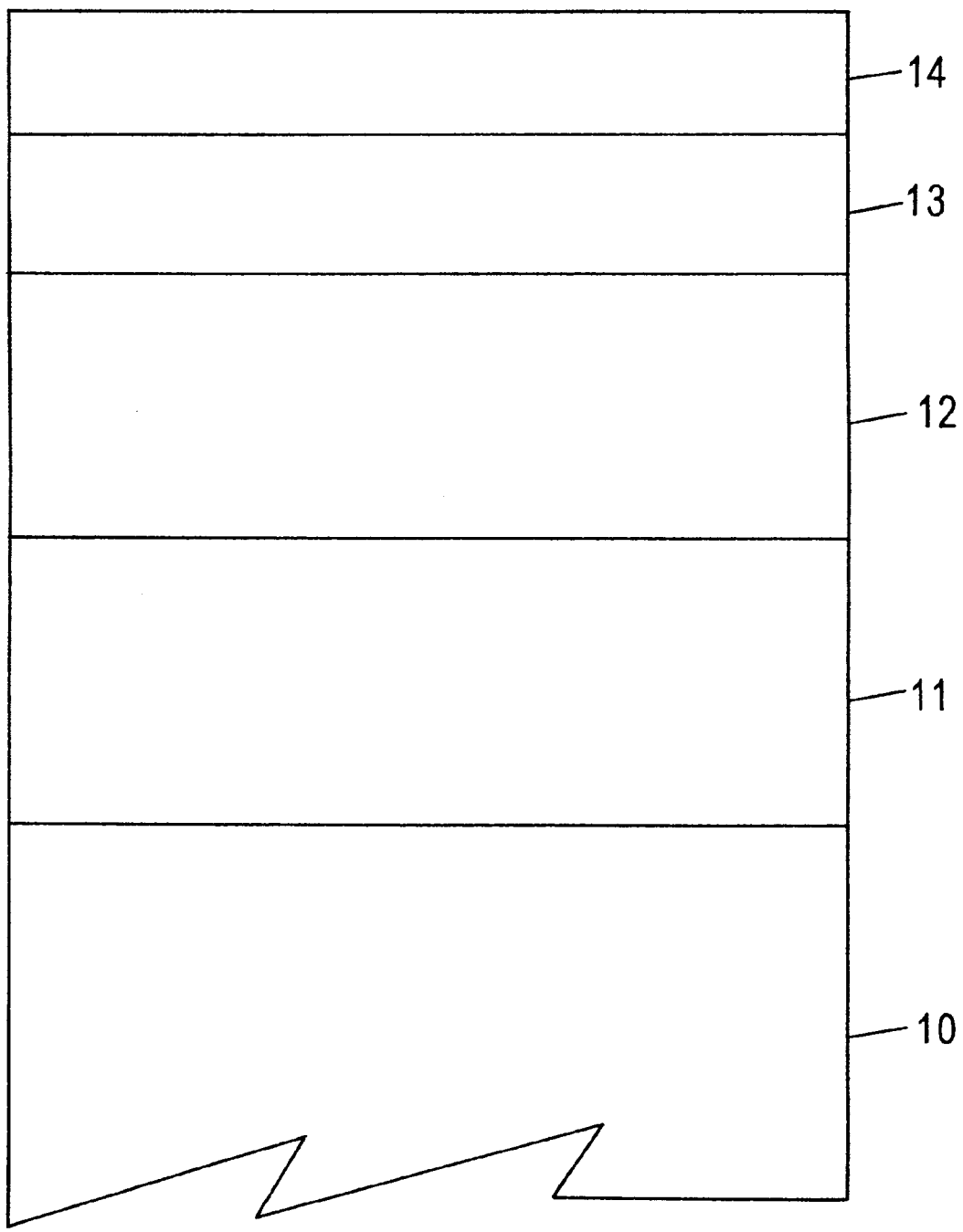
FIG. 1 schematically depicts, in cross-sectional view, a conventional magnetic recording medium structure comprising an Al-based substrate.
Figure 2:
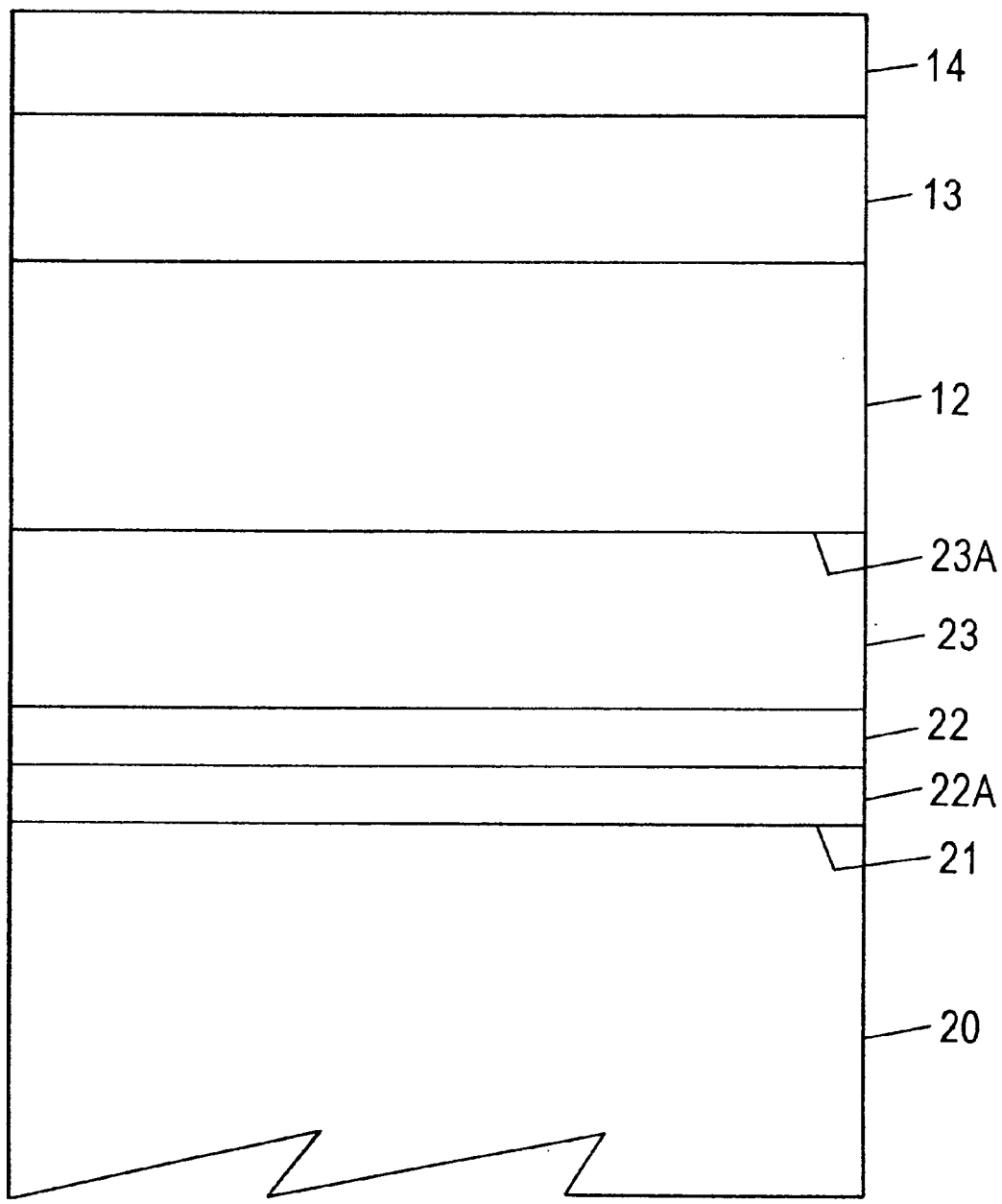
FIG. 2 schematically depicts, in cross-sectional view, a magnetic recording medium structure formed according to the present invention and comprising an alternative-type substrate.

Referring now to FIG. 2, shown therein in simplified cross-sectional form, is an illustrative, but not limitative embodiment of the present invention, wherein similar reference numerals as shown in FIG. 1 are employed to denote similar features. As will be apparent to one of ordinary skill in the art, the inventive methodology is readily adapted for use in the manufacture of a variety of magnetic recording media, e.g., magneto-optical (MO) media. It should also be recognized that the process steps and structures described below do not necessarily form a complete process flow for manufacturing such media. However, the present invention can be practiced in conjunction with conventional deposition techniques and methodologies as are currently employed in the art, and only so much of the commonly practiced process steps are included here as are necessary for providing an understanding of the present invention. Finally, the drawing figures each representing cross-sections of a portion of a magnetic recording medium are not drawn to scale, but instead are drawn as to best illustrate the features of the present invention.

Referring now more particularly to FIG. 2, a longitudinal recording disk medium 2 according to the present invention, comprises an alternative-type substrate 20 comprising a material having a Young's Modulus greater than that of Al or Al-based alloys (e.g., Al—Mg), i.e., greater than about 72 Gpa, and is selected from the group consisting of glass, glass-ceramics, ceramics, and metal-ceramic composites. The thickness of substrate 20 is selected to provide a desired rigidity and strength, and is in the range of from about 0.5 to about 1.27 mm thick, typically about 0.8 mm thick. According to the present invention, the substrate 20 can be utilized without any preliminary smoothening treatment of the upwardly facing surface 21, as by lapping, grinding, or polishing, providing the average roughness (Ra) thereof is less than about 2,000 Å, e.g., about 800 Å. Ready-to-use glass and glass-ceramic substrates suitable for the practice of the present invention and having an Ra<2,000 Å are available from inter alia, Hoya, Yamanashi, Japan; Ohara Corp., Kanagawa, Japan; and NGK-Locke, Inc., Sunnyvale, Calif.

In a first step according to the present invention, a continuous, adherent, layer 22 from about 50 to about 5,000 Å thick, typically about 100 to about 1,000 Å thick, is deposited on the surface 21 of substrate 20, as by a physical vapor deposition (PVD), chemical vapor deposition (CVD), to plasma-enhanced chemical vapor deposition (PECVD) technique. Layer 22 is comprised of a metal, a metal alloy, or a compound thereof with a non-metal and must fulfill the following requirements: (1) be non-magnetic; (2) be catalytically active for electroless plating thereon of suitable amorphous seed layer materials, e.g., Ni—P; and (3) have good adhesion to both the substrate and the seed layer. Suitable materials for catalytically active layer 22 include metals such as Ni, Pd, Ti, Al, Zn, Cu, and alloys (e.g., Ni—Al) and compounds thereof with non-metals, e.g., NiP. In addition to the enumerated metals, a hybrid layer comprising a plurality of deposited metal layers can also be utilized.

In some instances, an adhesion promoting layer 22A may be first deposited over substrate surface 21 prior to depositing catalytically active layer 22 thereon. Such adhesion promoting layer 22A may be from about 10 to about 100 Å thick, typically about 30 to about 40 Å thick, and comprise a metal such as Cr or Ti and alloys thereof, or alumina ($Al_2O_3$) or other ceramic material.

A suitable PVD technique for depositing each of the catalytically active and adhesion promoting layers is cathode sputtering, either DC or RF activated, depending upon the electrical conductivity of the sputtering target. By way of illustration, but not limitation, suitable continuous, adherent, catalytically active layers 22 comprising Ni—Al alloys or Ni—P (P=15–25 at %) compounds may be deposited by DC magnetron sputtering of similarly composed targets at a power density of about 0.5 kW/in$^2$, an Ar pressure of about 10 mTorr, and a substrate temperature of about 100° C.

In the next step according to the present invention, substrate 20 with continuous, catalytically active layer 22 formed on surface 21 is immersed in an electroless plating bath of the type conventionally utilized for forming amorphous plating layers on Al-based magnetic recording medium substrates, for forming thereon an amorphous seed layer 23 of a material which induces a next-deposited magnetic recording media underlayer 12, typically of Cr or Cr-based alloy, to exhibit polycrystallinity with a desired crystallographic orientation which, in turn, causes the magnetic alloy layer 13 deposited thereon to exhibit an optimal crystal microstructure for high-density recording. Suitable materials for amorphous seed layer 23 include Ni—P alloys with a P content of from about 10 to about 13.5 wt. %. According to a feature of the present invention, the amorphous seed layer is electrolessly plated for a sufficient interval under suitable conditions of temperature and solution replenishment such that: (1) the resultant thickness of the amorphous seed layer is about 1 to about 20 $\mu$m, typically about 8 to about 12 $\mu$m; and (2) the average surface roughness (Ra) of the resultant seed layer surface 23A is substantially less, typically at least about one-third less, than that of substrate surface 20A, e.g., less than about 550 Å. The resultant seed layer surface 23A provided by the inventive methodology is, after optional additional polishing depending upon the surface finish of the original substrate, substantially defectfree in relation to its intended use, i.e., manufacture of magnetic recording media. For example, if relatively rough (i.e., Ra>100 Å) substrate starting blanks are employed, post-electroless deposition polishing is required in order to the achieve low roughness surfaces contemplated by the present invention. However, according to the inventive methodology, polishing is advantageously performed on the softer, more friendly Ni—P amorphous seed layer surface rather than on the hard and/or multi-phase substrate surface, as in the conventional methodology. Alternatively, the need for polishing of the electrolessly-plated Ni—P amorphous seed layer may be eliminated by utilizing smooth substrate blanks (i.e., Ra<100 Å), in which case processing may proceed directly to texturing or media layer deposition.

A particularly suitable material for use as amorphous seed layer 23 is Ni—P. Suitable baths for electroless plating of non-magnetic Ni—P layers are disclosed in U.S. Pat. No. 4,659,605, the entire disclosure of which is incorporated herein by reference. By way of illustration, but not limitation, a suitable electroless plating bath for deposition of amorphous Ni—P seed layers consistent with the requirements of the present invention includes a source of nickel ions (typically $NiSO_4$), hypophosphite ions, a buffering agent (e.g., a carboxylic acid, boric acid or soluble borate, and an ester complex (e.g., an ester complex of glucoheptonic acid). Another suitable Ni—P electroless plating bath includes an unsaturated carboxylic acid, a nickel ion source, and hypophosphite ions. Baths of this type can provide amorphous Ni—P deposits with a phosphorus content within the range of from about 10 to about 13.5 wt. % at a high plating rate, which deposits are non-magnetic as provided and do not become magnetic with age. In addition to the above, electroless Ni—P plating baths usable in the present invention include, inter alia, Enthone 6450 (Enthone-OMI, New Haven, Conn.), Fidelity 4355 (OMG Fidelity Chemical Products Corp., Newark, N.J.), and UIC SHDX (Uyemura Int'l Corp., Ontario, Calif.).

Following electroless deposition of the amorphous seed layer 23 of sufficient thickness and reduced surface roughness (Ra) vis-à-vis the substrate surface 20A, magnetic underlayer 12 (typically of Cr or a Cr-alloy) is deposited thereon in conventional fashion without further surface treatment thereof other than optional polishing. Alternatively, the seed layer can be given a surface texturing or roughening treatment prior to deposition of magnetic underlayer 12 thereon, for inducing particular crystallographic structure of magnetic recording layer 13 deposited thereon, as disclosed in U.S. Pat. No. 5,733,370, the entire disclosure of which is incorporated herein by reference. Protective overcoat layer 14 is then formed over magnetic recording layer 13 in conventional manner, as by use of materials and procedures disclosed in U.S. Pat. No. 5,733,370.

EXAMPLE 1

Glass-ceramic substrates (NGK-Locke Inc., Sunnyvale, Calif.) having an as-supplied surface roughness of about 800 Å were sputtered with a 400 Å thick continuous, catalytically active layer and immersed in an Enthone 6450 (Enthone-OMI, New Haven, Conn.) electroless Ni—P plating bath at about 87–92° C., without a conventional sensitizing pre-treatment step. After 2.5 hours, with bath replenishment, a uniform coating of Ni—P about 12.5 μm thick was formed, with a reduced surface roughness (Ra) of about 550 Å.

Similar results were obtained with the use of sputtered Ni—P continuous, catalytically active layers about 10 to about 1,000 Å thick.

EXAMPLE 2

NGK glass-ceramic substrates of 800 Å Ra were sputtered with a 400 Å thick adhesion layer of Cr, followed by a 200 Å thick sputtered Ni—Al continuous, catalytically active layer. An about 12.5 μm thick amorphous Ni—P layer was electrolessly plated thereon from a Fidelity 4355 bath (Fidelity Chemical Products Corp., Newark, N.J.). The Ra of the Ni—P layer was about 550 Å.

Thus, in view of the foregoing, the present invention provides a number of advantages over the conventional Pd-based chemical sensitization processing for activation of non-conductive, or partially non-conductive alternative hard drive substrates for electroless plating thereon as part of a manufacturing process for magnetic recording media. More specifically, the inventive methodology is cleaner and simpler in that a reduced amount of mechanical polishing of the softer Ni—P surface is required. Plating defects due to acid etching and non-uniform coverage by the Pd sensitizer layer are eliminated. Re-mounting of disk mandrels and fixtures as are required by conventional Pd-based sensitization processing are not necessary, and less waste is generated.

In addition to the above, as compared to direct media processing of alternative-type substrates without a Ni—P seed layer, the present invention eliminates the requirement for preliminary grinding/lapping/polishing of the substrate prior to layer deposition thereon.

In the previous description, numerous specific details are set forth, such as specific materials, structures, reactants, processes, etc., in order to provide a better understanding of the present invention. However, the present invention can be practiced without resorting to the details specifically set forth. In other instances, well known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A method of fabricating a magnetic recording medium including a non-magnetic substrate having a Young's Modulus greater than that of aluminum (Al) and its alloys and a surface with a preselected average surface roughness (Ra), which method comprises the sequential steps of:

(a) depositing a continuous, adherent, non-magnetic, catalytically active layer on said substrate surface; and (b) electrolessly plating an amorphous seed layer comprising a metal, metal alloy, or metal compound on said catalytically active layer, the Ra of the resultant surface of said amorphous seed layer being reduced from said preselected Ra of said substrate surface, thereby providing a substantially defect-free surface for deposition thereon of layer(s) comprising said magnetic recording medium.

2. The method according to claim 1, wherein said substrate comprises a material selected from the group consisting of glass, glass-ceramics, ceramics, and metal-ceramic composites.

3. The method according to claim 2, wherein:

step (a) comprises depositing a continuous, catalytically active layer comprising a metal selected from the group consisting of Ni, Pd, Ti, Al, Zn, Cu, and alloys and compounds thereof with non-metals.

4. The method according to claim 3, wherein:
step (a) comprises depositing a layer of Ni—Al or Ni—P.

5. The method according to claim 3, wherein:
step (a) comprises depositing said catalytically active layer by sputtering.

6. The method according to claim 3, wherein:
step (a) includes first depositing an adhesion layer comprising a metal, metal alloy, or a ceramic material on said substrate surface and depositing said catalytically active layer thereon.

7. The method according to claim 2, wherein:
step (b) comprises electrolessly plating an amorphous seed layer comprising a material selected from Ni—P alloys with P content of from about 10 to about 13.5 wt. %.

8. The method according to claim 7, wherein:
step (b) further comprises polishing said Ni—P amorphous seed layer.

9. The method according to claim 1, comprising the further steps of:
(c) depositing a magnetic recording layer over said amorphous seed layer; and
(d) forming a protective overcoat layer over said magnetic recording layer.

10. The method according to claim 1, wherein said substrate comprises a glass-ceramic material having a surface with an Ra of about 800 Å, wherein:
step (a) comprises sputter depositing a continuous, catalytically active layer comprising about 50 to about 5,000 Å of Ni—Al or Ni—P; and
(b) comprises electrolessly plating a seed layer of amorphous Ni—P from about 1 to about 20 μm thick and having a substantially defect-free surface with an Ra of less than about 550 Å.

11. The method according to claim 10, wherein:
step (a) further comprises depositing an about 10 to about 100 Å thick layer of an adhesion material selected from the group consisting of chromium (Cr), titanium (Ti), Cr—Ti alloys, alumina ($Al_2O_3$), and other ceramics on said substrate surface prior to depositing said catalytically active layer thereon.

12. The method according to claim 11, comprising the further steps of:
(c) depositing a magnetic recording layer over said amorphous Ni—P seed layer; and
(d) forming a protective overcoat layer over said magnetic recording layer.

13. A magnetic recording disk produced according to the method of claim 12.

14. A magnetic recording medium, comprising:
a non-magnetic substrate having a Young's Modulus greater than that of Al and its alloys and a surface with a preselected average surface roughness (Ra);

a continuous, adherent, non-magnetic, catalytically active layer on said substrate surface;

an electrolessly plated, amorphous seed layer comprising a metal, metal alloy, or metal compound on said catalytically active layer, the surface of said amorphous seed layer being substantially defect-free and having an Ra less than that of said substrate surface.

15. The magnetic recording medium according to claim 14, wherein:
said substrate comprises a material selected from the group consisting of glass, glass-ceramics, ceramics, and metal-ceramic composites;
said continuous, catalytically active layer comprises a metal selected from the group consisting of Ni, Pd, Ti, Al, Zn, Cu, and alloys and compounds thereof with non-metals; and
said electrolessly plated, amorphous seed layer comprises a material selected from Ni—P alloys with P content of from about 10 to about 13.5 at %.

16. The magnetic recording medium according to claim 15, further including:
a layer of an adhesion material selected from the group consisting of Cr, Ti, Cr—Ti alloys, $Al_2O_3$, and other ceramics between said substrate surface and said catalytically active layer.

17. The magnetic recording medium according to claim 14, further including:
a layer of a magnetic recording material over said amorphous seed layer; and
a protective overcoat layer on said layer of magnetic recording material.

18. The magnetic recording medium according to claim 15, wherein:
said substrate comprises a glass-ceramic material having a surface with an Ra of about 800 Å;
said continuous, catalytically active layer comprises an about 50 to about 5,000 Å thick layer of sputtered Ni—Al or Ni—P; and
said electrolessly plated seed layer comprises an about 1 to about 20 μm thick layer of amorphous Ni—P having a substantially defect-free surface with an Ra of less than about 550 Å.

19. A magnetic recording medium, comprising:
a non-magnetic substrate having a Young's Modulus greater than that of Al and a surface with a preselected average surface roughness Ra; and
means for providing a substantially defect-free surface for formation of a magnetic recording layer thereover and having an Ra less than said preselected Ra.

* * * * *